United States Patent [19]

Pedain et al.

[11] 3,992,316

[45] Nov. 16, 1976

[54] ORGANIC POLYISOCYANATE SOLUTIONS ADAPTED FOR USE IN LAQUER

[75] Inventors: Josef Pedain, Cologne; Marianne Dislich, Homberg-Meiersberg; Günter Oertel; Hans-Jürgen Muller, both of Cologne, all of Germany

[73] Assignee: Bayer Aktiengesellschaft, Leverkusen, Germany

[22] Filed: Aug. 22, 1975

[21] Appl. No.: 607,079

Related U.S. Application Data

[63] Continuation of Ser. No. 481,419, June 20, 1974, abandoned.

[30] Foreign Application Priority Data

June 27, 1973 Germany............................ 2332567
Mar. 26, 1974 Germany............................ 2414391

[52] U.S. Cl............................. 252/182; 260/75 NP; 260/75 NA; 260/77.5 MA; 260/77.5 A
[51] Int. Cl.².............. C08G 18/10; C07C 119/045
[58] Field of Search ................ 252/182; 260/75 NF, 260/75 NP, 77.5 A, 77.5 AA, 77.5 MA, 77.5 SS, 75 NA

[56] References Cited

UNITED STATES PATENTS

| 3,115,479 | 12/1963 | Windemuth et al. ........ 260/77.5 TB |
| 3,183,112 | 5/1965 | Gemassmer ................. 260/77.5 AT |
| 3,352,830 | 11/1967 | Schmitt et al. .............. 260/77.5 AT |
| 3,384,624 | 5/1968 | Heiss .......................... 260/77.5 MA |
| 3,393,177 | 7/1968 | Guest et al................... 260/77.5 TB |
| 3,425,973 | 2/1969 | Shaw .......................... 260/77.5 MA |
| 3,476,933 | 11/1969 | Mendelsohn.................. 260/2.5 AC |

*Primary Examiner*—Benjamin R. Padgett
*Assistant Examiner*—Irwin Gluck
*Attorney, Agent, or Firm*—Frederick H. Colen; Lawrence S. Pope; Gene Harsh

[57] ABSTRACT

The amount of unreacted 1-isocyanato-3,3,5-trimethyl-5-isocyanatomethyl-cyclohexane (IPDI) mixed with an adduct of IPDI and a polyhydroxyl compound having two or three hydroxyl groups in a solution thereof in a conventional lacquer solvent is reduced by mixing the solution with from 0.1 to 10 mols monohydric alcohol per mol of unreacted IPDI in the solution to provide a polyisocyanate solution adapted for use in making coating materials such as lacquers.

7 Claims, No Drawings

ORGANIC POLYISOCYANATE SOLUTIONS ADAPTED FOR USE IN LAQUER

This is a continuation of application Ser. No. 481,419, filed June 20, 1974; now abandoned.

This invention relates to a new process for the preparation of physiologically harmless solutions of isocyanate prepolymers based on 1-isocyanato-3,3,5-trimethyl-5-isocyanatomethyl-cyclohexane and to the solutions which can be obtained by this process.

The reaction of 1-isocyanato-3,3,5-trimethyl-5-isocyanatomethyl-cyclohexane (hereinafter also referred to as "IPDI") with less than equivalent quantities of polyhydroxyl compounds to form the corresponding isocyanate adduct has long been known in the art (U.S. Pat. No. 3,549,569 or British Pat. No. 1,301,484).

Although these known IPDI adducts are useful starting materials for the production of lightfast polyurethane lacquers, they still have the serious disadvantage of containing too high a proportion of free or unreacted relatively volatile IPDI. In addition, both the IPDI adducts of British Patent No. 1,301,484 and those of U.S. Pat. No. 3,549,569 which are prepared from low molecular weight polyols are insufficiently compatible or miscible with aliphatic hydrocarbon solvents for many practical applications.

It is therefore an object of this invention to provide a process by which IPDI and low molecular weight polyols are reacted to produce isocyanate prepolymers which not only have free IPDI content of less than 0.7 percent by weight but are also more compatible and miscible with aliphatic hydrocarbon solvents.

Another object of the invention is to provide a solution containing a conventional lacquer solvent and a prepolymer prepared by reacting 1-isocyanato-3,3,5-trimethyl-5-isocyanatomethyl-cyclohexane and a low molecular weight polyhydroxyl compound which contains so little unreacted 1-isocyanato-3,3,5-trimethyl-5-isocyanato-methyl cyclohexane that it is adapted to be used safely to make lacquers and similar coating materials.

The foregoing objects and others are accomplished in accordance with this invention, generally speaking, by providing a process for the selective urethanization of unreacted IPDI mixed with a reaction product of IPDI and a polyhydroxyl compound wherein a polyhydroxyl compound of the general formula

$R(OH)_n$ in which R represents an $n$-valent aliphatic hydrocarbon group containing 2 to 14 carbon atoms or an $n$-valent cycloaliphatic hydrocarbon group containing 5 to 15 carbon atoms and $n$ represents 2 or 3 is reacted with 1-isocyanato-3,3,5-trimethyl-5-isocyanatomethyl-cyclohexane, using an NCO/OH ratio of between about 3:1 and about 20:1, and the excess, unreacted 1-isocyanato-3,3,5-trimethyl-5-isocyanatomethyl-cyclohexane is subsequently removed in a two-stage operation in which the major proportion of unreacted excess of the diisocyanate is first removed by distillation and the distillation residue, which still contains 1 to 5 percent by weight of free 1-isocyanato-3,3,5-trimethyl-5-isocyanato-methyl-cyclohexane, is dissolved in approximately 0.1 to 20 times its weight of lacquer solvent and the resulting solution is reacted at 0° to 120° C with a 0.1 to 10 times molar quantity, based on the free 1-isocyanato-3,3,5-isocyanatomethyl-cyclohexane still present, of an alcohol of the formula R'OH in which R' represents an aliphatic hydrocarbon group containing 1 to 18 carbon atoms, a dialkylaminoalkyl group containing a total of 4 to 18 carbon atoms or an aliphatic hydrocarbon group with a total of 4 to 18 carbon atoms which contains ether oxygen bridges and which may also contain a tertiary amino end group. It has been found that unreacted monomeric IPDI reacts preferentially with the monohydric alcohol when mixed in solution with a prepolymer having terminal-NCO groups prepared by reacting IPDI and a polyhydroxyl compound to produce a substantially physiologically harmless solution containing less than 0.7 percent by weight, based on the solids content of the solution, of the more volatile unreacted IPDI. Surprisingly, the miscibility of the solution with mineral spirits and the like is greatly improved.

This invention also provides solutions of a prepolymer in a lacquer solvent which can be obtained by this process, which prepolymer is basically obtained by reacting excess 1-isocyanato-3,3,5-trimethyl-5-isocyanato-methyl-cyclohexane with an alcohol of the formula $R(OH)_n$, characterized by containing less than 0.7 percent by weight, based on the dissolved prepolymer, of unreacted 1-isocyanato-3,3,5-trimethyl-5-isocyanatomethyl-cyclohexane, in which formula R and n have the meaning indicated above.

The following are the starting materials used for the process according to the invention:

1. 1-Isocyanato-3,3,5-trimethyl-5-isocyanatomethyl-cyclohexane (IPDI),
2. Polyhydroxyl compounds of the formula $R(OH)_n$ in which R represents an $n$-valent aliphatic hydrocarbon group containing 2 to 14 carbon atoms or an $n$-valent cycloaliphatic hydrocarbon group containing 5 to 15 carbon atoms and n represents 2 or 3, and
3. Alcohols of the formula R'OH in which R' represents an aliphatic hydrocarbon group containing 1 to 18 carbon atoms, a dialkylaminoalkyl group containing a total of 4 to 18 carbon atoms or an aliphatic hydrocarbon group which has a total of 4 to 18 carbon atoms and containing ether oxygen bridges and which may also contain a tertiary amino end group.

Any suitable polyol of the formula $R(OH)_n$ may be used to make the prepolymer such as, for example, the polyhydric alcohols; ethylene glycol; butane-1,3-diol; butane-1,4-diol; tetradecane-1,14-diol; trimethylolpropane; glycerol; 1,3,6-trihydroxyhexane; 1,2-dihydroxycyclohexane; 1,4-dihydroxycyclohexane; 1,3,5-trihydroxycyclohexane; 4,4'-dihydroxydicyclohexylmethane and the like. Mixtures of such polyhydroxyl compounds may also be used. The preferred polyhydroxyl compound for the process according to the invention is trimethylolpropane.

Any suitable alcohol R'OH may be used to reduce the content of unreacted IPDI in the solution such as, for example, methanol; isopropanol; decanol; lauryl alcohol; stearylalcohol; N,N-diethyl-ethanolamine; N,N-dimethyl-1,4-butanolamine; 2-ethoxyethanol; 3-butoxypropanol or the like or an addition product of 1 to 7 mols of ethylene oxide or 1–5 mols of propylene oxide to a lower monohydric alcohol such as ethanol, propanol or butanol or to a secondary amine such as dimethylamine, diethylamine, dipropylamine, dibutylamine or the like. It is preferred to use $C_3$ to $C_{12}$ alkanols or dialkylaminoalkanols with a total of 4 to 10 carbon atoms for the process according to the invention. Diethylaminoethanol is preferred.

To carry out the process according to the invention, the polyhydroxyl compound $R(OH)_n$ is first reacted with IPDI at 40° to 160° C, preferably 70° to 120° C, using an NCO/OH ratio of between about 3:1 and about 20:1, preferably between about 4:1 and about 10:1. This reaction, which is known per se, is preferably followed by removal of the major quantity of excess IPDI by thin layer distillation. The resulting distillation residue generally still contains 1 to 5% by weight of free IPDI. This residue is then dissolved in a suitable solvent to form a 5% to 90% by weight, preferably 50 to 80 percent by weight solution. Any suitable solvent such as the usual polar lacquer solvents including ethyl acetate, butyl acetate, methyl ethyl ketone, methyl isobutyl ketone, ethylene glycol-monoethylether acetate, or the like, which solvents may be mixed with 0 to 80 volume percent, preferably 50 to 80 volume percent of a solvent, an aromatic hydrocarbon solvent such as toluene, xylene, higher alkyl benzene or the like. The alcohol R'OH is then added to the resulting solution in a 0.5 to 10 times, preferably 2 to 6 times molar quantity, based on the free IPDI. This addition of alcohol is carried out at temperatures of between 0° to 120° C, preferably between 20° and 90° C. The reaction mixture is then left to stand, preferably at room temperature, until the selective urethanization reaction of excess IPDI, which is an essential feature of the invention, has been completed. The resulting product of the process according to the invention is a 5 to 90 percent by weight, preferably 50 to 80 percent by weight solution which mainly contains an isocyanate prepolymer based on IPDI and which is characterized by containing less than 0.7 percent by weight, based on the isocyanate prepolymer, of free IPDI.

The products provided by the invention are further distinguished by an isocyanate content (based on solid substance) of over 5 percent by weight, preferably over 10 percent by weight, a low viscosity and high compatibility in particular with nonpolar lacquer solvents such as mineral spirits. The reactivity of the dissolved IPDI adducts with compounds which contain hydrogen atoms capable of reacting with isocyanate groups depends among other things on the choice of alcohol R'OH and can be substantially increased particularly by using amino alcohols. The products of the process are valuable starting materials for the production of two component polyurethane lacquers and, in particular, they are eminently suitable as cross-linking agents for air drying alkyd resins. In combination with such reactants, the products of the process have an astonishingly long pot life.

EXAMPLE 1

134 Parts of trimethylolpropane are gradually introduced into 1998 parts of 1-isocyanato-3-isocyanatomethyl-3,5,5 trimethyl-cyclohexane at 80° to 90° C and reacted at this temperature until the isocyanate group content is constant (NCO/OH ratio = 6:1). The reaction product is then distilled at 12 Torr by passing the substance continuously through a tube heated to 170° to 190° C in which the substance is spread out to a thin film by moving metal blades. The time of stay in this tube is only between 30 secs. and 2 minutes. A lacquer polyisocyanate which can be dissolved in xylene/ethyl glycol acetate (1:1) to form a 67 percent solution is obtained in this way. The solution has an isocyanate group content of 11% by weight. The amount of gas chromatographically determined free or unreacted 1-isocyanato-3-isocyanatomethyl-3,5,5-trimethyl-cyclohexane in the solution is 3.3% by weight (based on the solids content).

EXAMPLE 2

This Example describes a product prepared according to Example 1 of British Patent No. 1,301,484 for comparison. 83.25 Parts of IPDI are reacted with 16.75 parts of trimethylolpropane (NCO/OH ratio = 2:1) as indicated in the said patent specification. The resulting substance is also dissolved in xylene/ethyl glycol acetate (1:1) to form a 67 percent solution. The isocyanate content of the solution is 11.2 percent and the free IPDI content, calculated as solid substance, is 9.7 percent according to gas chromatographic determination.

EXAMPLE 3

15 Parts of lauryl alcohol are added to 150 parts of the 67 percent solution obtained in Example 1 and the reaction mixture is stirred for 3 hours at 90° C after dilution with 5 parts of a 1:1 mixture of xylene/ethyl glycol acetate. The isocyanate content of the solution is then 7.6 percent by weight and the free, unbound IPDI content is 0.5 percent by weight, based on the solids content.

EXAMPLE 4

The properties of the product prepared in Examples 1, 2 and 3 are compared:

|  | Product Example 1 | Product Example 2 | Product Example 3 |
|---|---|---|---|
| Viscosity of the 67% solution at 20° C | 2300 cp | 25000 cp | 2500 cp |
| Maximum dilution with mineral spirits without cloudiness | up to 50% | up to 50% | up to 30% |
| Unbound IPDI content, based on solids content | 3.2% by weight | 9.7% by weight | 0.5% by weight |
| Compatibility with a medium oily alkyd resin modified with dry vegetable fatty acids, which is mixed with products 1,2 and 3 in the ratio of 100:15 | cloudiness after 2 hours | cloudiness after 1 hour | solution still completely clear after 25 hours |

The comparison experiment shows that the substance from Example 3 is the only one which optimally fulfills the requirements of a cross-linking agent for alkyd resin lacquers used for motor car repairs, namely low viscosity, low monomer content, ease of dilution and high compatibility.

EXAMPLE 5

A mixture of 90 parts of butane-1,3-diol and 210 parts of trimethylolpropane is reacted with 4700 parts of IPDI as described in Example 1 and most of the excess unbound diisocyanate is removed by very careful thin layer distillation employing a short time of stay in the distillation apparatus at about 150° C and 1 mm Hg, and the reaction product is then dissolved to form a 67 percent solution in xylene/ethyl glycol acetate without first isolating it. The solution has an isocyanate content of 9.8 percent by weight.

EXAMPLE 6

4.9 Parts of diethylethanolamine are added to 100 parts of the 67 percent solution from Example 5 and the reaction mixture is left to stand at room temperature for 12 hours. It is then diluted with 1.6 parts of a 1:1 mixture of xylene/ethyl glycol acetate. The isocyanate of the solution is then 6.9 percent.

EXAMPLE 7

7.04 Parts of lauryl alcohol are added to 100 parts of the 67 percent solution from Example 5. The solution is then adjusted to a concentration of 67 percent by weight with xylene/ethyl glycol acetate and stirred at 40° to 50° C for 8 hours. The isocyanate content of the solution is then 7.2 percent.

EXAMPLE 8

24 Parts of isopropanol are added to 800 parts of the 67 percent solution from Example 5 and the solution is adjusted to 67 percent by weight with xylene/ethyl glycol acetate. The isocyanate content of the solution is then 7.0 percent by weight.

EXAMPLE 9

The properties of the products prepared in Examples 5, 6, 7 and 8 are compared.

|  | Product Example 5 | Product Example 6 | Product Example 7 | Product Example 8 |
| --- | --- | --- | --- | --- |
| Viscosity of 67% solution at 20° C | 2500 cp | 2800 cp | 3000 cp | 3400 cp |
| NCO content of the 67% solution | 9.8% by weight | 6.9% by weight | 7.2% by weight | 7.0% by weight |
| Unbound diisocyanate content in terms of solid substance | 2.4% by weight | 0.6% by weight | 0.5% by weight | 0.5% by weight |
| Storage time at 25° C without cloudiness of a solution diluted to 20% with xylene/mineral spirits (1:1) | 1 day | 7 days | 120 days | 70 days |
| Storage time at 25° C without cloudiness of a solution diluted to 15% with xylene/mineral spirits 21 (1:1) | 18 days | 27 days | 33 days | 30 days |

EXAMPLE 10

The properties of the combination of substances from Example 5, 6 and 7 are compared with those of a commercial air drying alkyd resin. The alkyd resin contains 48 percent of drying vegetable fatty acids and 26 percent of phthalic acid anhydride and is dissolved as a 55 percent solution in white spirit / xylene (38:7).

A lacquer of the following composition suitable for motor car repairs is produced from the alkyd resin with various auxiliary products:

|  | Parts by weight |
| --- | --- |
| Alkyd resin (55% solution in mineral spirits/xylene 38:7) | 182.0 |
| TiO$_2$ (pigment) | 65.0 |
| Zinc octoate (8% metal) fl. | 0.6 |
| Mixture of alkyl aromatic solvents b.p. 150–180° C | 20.0 |
| Ethyl glycol acetate | 3.0 |
| Anti-skinning agent | 1.5 |
| Silicone levelling agent 1% | 3.0 |
| Co-octoate (8% metal) fl. | 1.0 |
| Pb-octoate (24% metal) | 4.2 |

15 percent by weight and 30 percent by weight (calculated as solid to solid) of the substances from Examples 5, 6 and 7 were added to this alkyd resin lacquer and some of the properties of the lacquer films were compared. The following Table shows some of the improvements obtained with the products from Examples 6 and 7 compared with the pure alkyd resin lacquer and with the product from Example 5.

|  | Pure alkyd resin lacquer | Product from Example 5 15% added | Product from Example 5 30% added | Product from Example 6 15% added | Product from Example 6 30% added | Product from Example 7 15% added | Product from Example 7 30% added |
| --- | --- | --- | --- | --- | --- | --- | --- |
| Pot life (lacquer mixture still flows without lumps or gel particles) | 330 h | 86 h | 36 h | 90 h | 38 h | 330 h | 53 h |
| Elasticity according to DIN 53,156 after 14 days of the lacquer films on deep drawn sheet iron | 8 mm | 5.6 mm | 4.0 mm | 7.0 mm | 4.0 mm | 7.8 mm | 5.9 mm |
| Thickness of lacquer film 40–50 μ Pendulum hardness (according to König) after 16 hours | 19 sec | 36 sec | | 50 sec | | 45 sec | |
| Removability with adhesive after 16 hours air drying, adhesive tape | strong marking | moderate | satisfactory | satisfactory | satisfactory | moderate | satisfactory |

| | Pure alkyd resin lacquer | Product from Example 5 15% added | Product from Example 5 30% | Product from Example 6 15% added | Product from Example 6 30% | Product from Example 7 15% added | Product from Example 7 30% |
|---|---|---|---|---|---|---|---|
| removed after 15 min., assessment after 30 min. | | marking | | | | marking | |
| Resistance to super petrol after 7 days (action time 20 min. regeneration 30 min.) | very severe marking | severe marking | no marking | slight marking | no marking | severe marking | no marking |

This Table also shows that the products modified according to the invention (Example 6 and 7) provide in part minor improvements and in part very significant improvements.

Although the invention has been described in detail for the purpose of illustration it is to be understood that such detail is solely for that purpose and variations can be made therein by those skilled in the art without departing from the spirit and scope of the invention except as it may be limited by the claims.

What is claimed is:

1. A process for the preparation of physiologically harmless solutions of polyisocyanates in lacquer solvents which comprises mixing and reacting polyhydroxyl compounds of the general formula $$R(OH)_n$$

in which R represents an n-valent aliphatic hydrocarbon group containing 2 to 14 carbon atoms or an n-valent cycloaliphatic hydrocarbon group containing 5 to 15 carbon atoms and n represents 2 or 3 with 1-isocyanato-3,3,5-trimethyl-5-isocyanatomethyl-cyclohexane in an NCO/OH ratio of between about 3:1 and about 20:1, removing the excess unreacted 1-isocyanato-3,3,5-trimethyl-5-isocyanatomethyl-cyclohexane in the mixture in a two-stage operation in which the major proportion of unreacted excess diisocyanate is first removed by distillation and the resulting distillation residue which still contains 1 to 5 percent by weight of unreacted 1-isocyanato-3,3,5-trimethyl-5-isocyanato-methyl-cyclohexane is dissolved in approximately 0.1 to 20 times its weight of lacquer solvent, mixing the resulting solution at 0° to 120° C with 0.5 to 10 times molar quantity, based on the quantity of unreacted 1-isocyanato-3,3,5-trimethyl-5-isocyanatomethyl-cyclohexane still present, of an alcohol of the formula R'OH in which R' represents an aliphatic hydrocarbon group containing 3 to 12 carbon atoms.

2. The process of claim 1 wherein the polyhydroxyl compound $R(OH)_n$ is trimethylolpropane.

3. The process of claim 1 wherein the alcohol R'OH is lauryl alcohol.

4. The process of claim 1 wherein 2 to 6 times molar quantity, based on the quantity of unreacted 1-isocyanato-3,3,5-trimethyl-5-isocyanatomethyl-cyclohexane still present, of said monohydric alcohol is mixed with said solution.

5. A solution in a lacquer solvent containing predominantly an adduct prepared by reacting excess 1-isocyanato-3,3,5-trimethyl-5-isocyanatomethyl-cyclohexane with an alcohol of the formula $R(OH)_n$ and containing less than 0.7 percent by weight, based on the dissolved polymer, of unreacted 1-isocyanato-3,3,5-trimethyl-5-isocyanatomethyl-cyclohexane, in which formula R and n have the meaning indicated in claim 1.

6. In the preparation of an adduct of 1-isocyanato-3,3,5-trimethyl-5-isocyanatomethyl-cyclohexane and a polyhydric alcohol having two or three hydroxyl groups by a process which comprises reacting an excess of the said diisocyanate with the said alcohol and reducing the unreacted diisocyanate content of the resulting mixture, the improvement which comprises dissolving the mixture in an organic solvent therefor and mixing from about 0.5 to about 10 mols of a $C_3$ to $C_{12}$ aliphatic monohydric alcohol per mol of free 1-isocyanato-3,3,5-trimethyl-5-isocyanato-cyclohexane with the resulting solution thereby making said solution compatible and miscible with aliphatic hydrocarbon solvents.

7. In the process of claim 6 the further improvement wherein 2 to 6 mols of said monohydric alcohol per mol of unreacted diisocyanate is mixed with said solution.

* * * * *